United States Patent [19]
Berghausen

[11] 3,888,507
[45] June 10, 1975

[54] VEHICLE BALLAST WEIGHT ASSEMBLY

[75] Inventor: Jakob Berghausen, Nievenheim, Germany

[73] Assignee: International Harvester Company, Chicago, Ill.

[22] Filed: Oct. 21, 1974

[21] Appl. No.: 516,568

[52] U.S. Cl. .......................................... 280/150 E
[51] Int. Cl.² ........................................ B60R 27/00
[58] Field of Search ............... 280/150 E; 212/49; 187/9 R, 9 E

[56] References Cited
UNITED STATES PATENTS

| | | | |
|---|---|---|---|
| 3,490,787 | 1/1970 | Catterman et al. | 280/150 E |
| 3,492,019 | 1/1970 | Folkerts | 280/150 E |
| 3,635,493 | 1/1972 | Barth et al. | 280/150 E |
| 3,709,520 | 1/1973 | Johnson | 280/150 E |
| 3,730,545 | 5/1973 | Allori | 280/150 E |
| 3,758,132 | 9/1973 | Elfes et al. | 280/150 E |
| 3,822,073 | 7/1974 | Sieren | 280/150 E |

FOREIGN PATENTS OR APPLICATIONS

| | | | |
|---|---|---|---|
| 1,530,219 | 1/1970 | Germany | 280/150 E |
| 1,680,136 | 9/1971 | Germany | 280/150 E |

Primary Examiner—David Schonberg
Assistant Examiner—Michael J. Forman
Attorney, Agent, or Firm—Raymond E. Parks; Floyd B. Harman

[57] ABSTRACT

A ballast weight assembly having a base weight member connected to the front end of a tractor and an auxiliary rectangular prismic-like weight mounted on the member. The member and the weight having upper mating surfaces and lower interlocking surfaces for fixing the weight to the member.

10 Claims, 4 Drawing Figures

PATENTED JUN 10 1975

3,888,507

SHEET 1

3,888,507

VEHICLE BALLAST WEIGHT ASSEMBLY

FIELD OF INVENTION

This invention relates to a ballast weight assembly for mounting to the front end of a tractor. The ballast weight assembly is of the type which comprises one or more portable weights that can be selectively installed on or removed from a basic ballast weight, which is mounted on the front end of the tractor, to provide stabilization and traction to maintain steering control of the vehicle.

In the use of tractor vehicles, particularly for agricultural or other earth-working purposes, it is customary to attach or mount an earth-working implement either to the rear end portion or somewhere on the framework between the front and rear wheels of the tractor. It is also customary to add one or more detachable or removable auxiliary or supplemental ballast weights to the vehicle, so as to provide either for additional traction or for steering stability of the vehicle according to the demands of the particular operation.

In order to obtain the maximum steering stability or positive steering effect, where rear mounted tools or equipment are used, such supplemental weights are best attached at the forward portion of the vehicle and, heretofore, this was found to be a most desirable and frequently used location, although the practice of attaching additional weights to the tractor wheels of the vehicle also continues to be a popular and commonly employed expedient for traction increasing purposes.

DESCRIPTION OF THE PRIOR ART

Examples of auxiliary ballast weight assemblies are shown in the following U.S. patent Nos.: 3,758,132, Elfes et al Sept. 11, 1973; 3,730,545, Allori May 1, 1973; 3,709,520, Johnson Jan. 9, 1973; 3,635,493, Barth et al Jan. 18, 1972; 3,492,019, Folkerts Jan. 27, 1970; 3,490,787, Latterman et al Jan. 20, 1970.

GERMAN PUBLICATIONS: 1530 919 (Ausleges-chrift), Schmahl Jan. 29, 1970; 1680 136 (Offenlegungsschrift) Spiller et al Sept. 23, 1971; 1941 316 (Auslegeschrift), Barth et al Mar. 11, 1971.

The United States Patent and its corresponding German publication to Barth et al shows a base weight, having a hitch means, fixed to the front end of the tractor. A plurality of identical plate-shaped weights are mounted in side-by-side relationship across the base weight. Two transversely extending bolts snug the plates together, and every two adjacent weights form a plurality of hitch points.

The United States Patent to Johnson shows an anchor arrangement at the opposite sides of the plates which snugs the plates together; the Elfes et al patent shows the bottom of the plates clamped to the weight support; the Allori patent clamps the weights to the support by an angle iron and snugs them together by an eccentric bolt means; Latterman et al connects the plates together by an axially extending bolt; and Folkert snugs the plates together by a transverse rod on the top of the plates and anchors the bottom of plates by a pin to the weight support. The German publication to Schmahl connects the plates to the support and snugs the plates together by an axially extending bolt; and the Spiller et al reference connects each plate by a vertically extending bolt to the basic ballast weight.

SUMMARY OF THE INVENTION

According to the present invention there is provided a ballast weight assembly for mounting on the front end of a tractor comprising a generally rectangular prismic-like base weight member connected across the front end of the tractor. The top side of the member is provided with an elongate channel that has at least one inclined wall which extends upwardly toward the front side of the member. This wall has at least one V-shaped notch that also extends upwardly toward the front side of the member. The front side of the member is provided with a centrally located cavity which forms a clevis for a hitch. On the top side there is a hole which passes into the clevis, and on the bottom side of the member there is an elongate groove. A generally rectangular prismic-like weight is mounted on the member. The weight has a generally U-shaped opening which is notched in one leg of the U forming a hook with a tip depending into the channel of the member. The notch has an inclined wall which extends toward the opening of the U and is provided with an inverted V-shaped surface that mates with the V-shaped groove in the channel. The base of the U abuts the front side of the member and the other leg of the U extends under the bottom side of the member and has a transverse groove that aligns vertically with the elongate groove in the bottom of the member. An elongate bar extends in the space between the grooves and keys the mounted weight to the member.

Additional auxiliary weights are provided and are mounted on the member by increasing the number of the V-shaped notches in the wall of the channel. One of the weights is a center ballast weight that is three times as wide as the individual auxiliary weights. It has a clevis on the front end and is hitched at the rear end, by a pin, to the clevis of the base weight member.

The ends of the elongate or locking bar are provided with abutting means for preventing axial shifting of the bar. In addition the weights and the lateral sides of the member which are adjacent to the abutting means are provided with notches countersinking the abutting means.

DESCRIPTION OF THE DRAWING

For a better understanding of the invention, reference will now be made by way of example to the accompanying figures of the drawing in which.

DESCRIPTION OF THE PREFERRED EMBODIMENT

Figure 1:
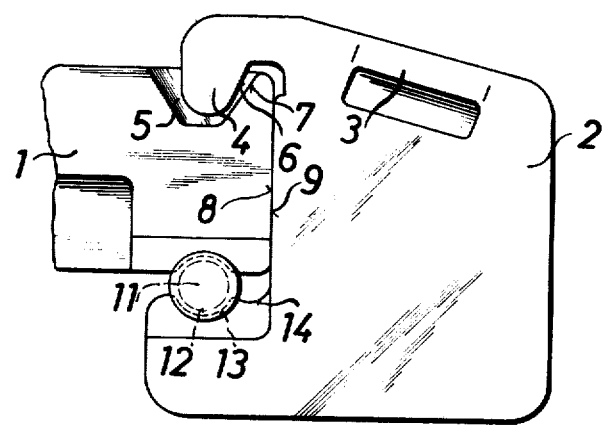
FIG. 1 is a plan view of an auxiliary ballast weight assembly which is mounted on the front of a basic ballast weight that is carried on the front end of a tractor partially shown in wavy lines.

Referring to the drawing, a basic ballast weight 1 is mounted on the front of a tractor partially shown in wavy lines. The basic ballast weight 1 forms a support element for one or more auxiliary ballast weights 2 and 19. Each auxiliary ballast weight 2 and 19 is provided with a lifting handle 3 and a U-shaped recess forming an upper hook-shaped protrusion 4 in one leg of the U and a lower flat protrusion 14 in the other leg of the U. The upper hook-shaped protrusion 4 has an inclined wall portion 6, the surface of which, is of an inverted V-shape and rests in a corresponding V-shaped notch portion 7 of a groove 5 formed in the top or upper surface of the rectangular prismic-like basic ballast weight 1. The lower or bottom surface of the basic ballast weight 1 and the lower leg of the U or flat protrusion 14 are each provided with elongate grooves or channels 12 and 13 respectively which accommodate an elongate bar 11. The grooves and bar may be of any corresponding configuration, although circular grooves and a cylindrical bar are shown in the preferred embodiment. The bar 11 keys or fixes the auxiliary ballast weight 2 and 19 to the basic ballast weight 1.

Figure 4:
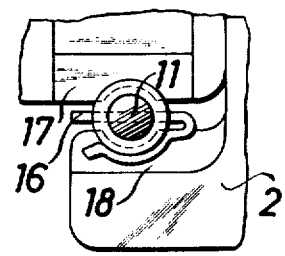
FIG. 4 is a partial view of the left side of the locking bar shown in FIG. 2.

The locking bar 11 is provided at one end with an enlarged head portion 15 that lies in recesses provided in the lateral side of the basic ballast weight 1 and in the auxiliary ballast weight 2 which is adjacent the head portion. The other end of the locking bar 11, as shown in FIG. 4, is provided with a securing pin 16 and a washer, which lie in recesses 17 and 18 formed in the opposite lateral side of the basic ballast weight 1 and in the opposite auxiliary ballast weight 2 which is adjacent the securing pin 16, respectively. The recesses at both ends of the locking bar countersink the head portion and the pin portion of the locking bar.

The hitch member 19 occupies the space of three auxiliary ballast weights 2 and is provided with a lifting handle or eye 25, and upper and lower flat protrusions similar to 4 and 14 of the individual ballast weights 2. The only differences between the center ballast and the individual ballast are a towing clevis 21 is mounted on the front of the hitch member 19, which is provided with an aperture for receiving a coupling pin, such as pin 23, and that the upper flat protrusion is provided with a bore 22 which also receives a coupling pin 23. A locking pin 24 prevents the coupling pin 25 from being accidently withdrawn during earth working operations.

Figure 3:
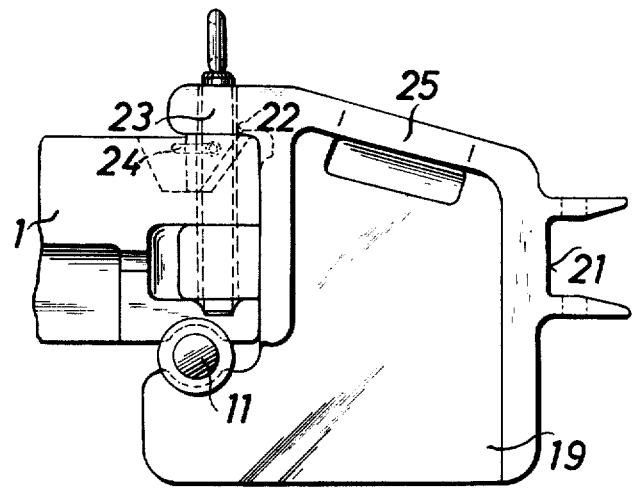
FIG. 3 is a plan view of the center ballast weight.

As shown in FIG. 3, the hitch member 19 is hitched to the clevis of the basic ballast weight 1 and is keyed thereto by the locking bar 11 which passes through the arcuate grooves or channels 12 and 13 respectively formed in the bottom side of the ballast weight 1 and in the upper surface of the lower leg of the U.

After extracting the pin 16 and withdrawing the locking bar 11, each of the auxiliary ballast weights 2 can be removed from the basic ballast weight 1. In order to remove the center ballast weight or hitch member 19, the locking pin 24 is withdrawn from the coupling pin 23 and the coupling pin 23 is then withdrawn upwardly through the bore 22.

Figure 2:
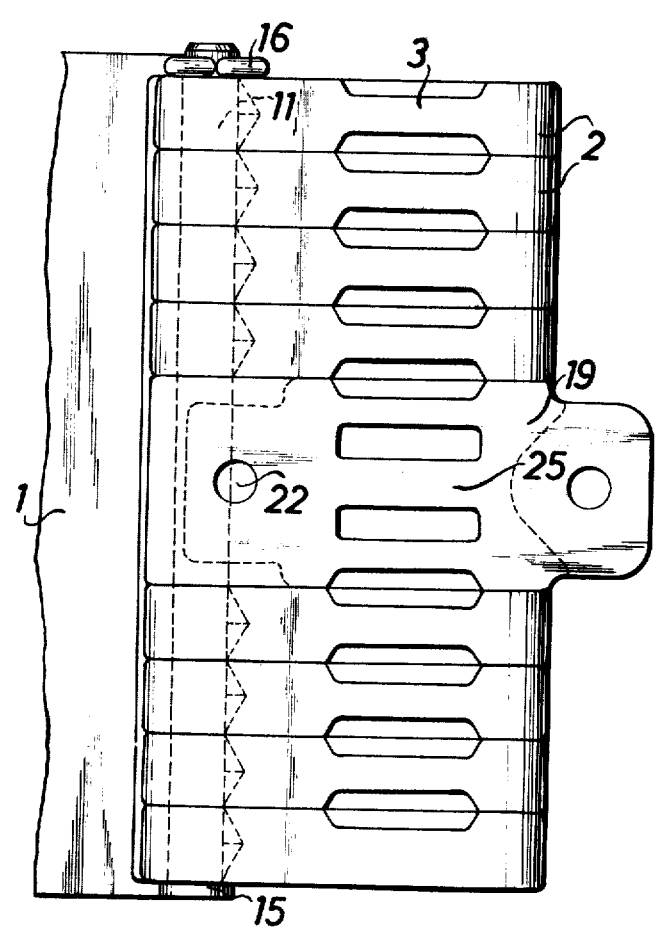
FIG. 2 is a top view of FIG. 1, showing a center ballast weight sandwiched between a plurality of auxiliary weights.

It will be appreciated that when an auxiliary counterweight 2 is placed on the basic ballast weight 1, the hook-shaped protrusion 4 slides downwardly along the inclined portion 7 of the groove 5 thereby drawing the auxiliary ballast weight 2 toward the basic ballast weight 1, until the vertical surface 9 of the auxiliary ballast weight 2 abuts the vertical surface 8 of the basic ballast weight 1, at which position arcuate channels 12 and 13 are substantially vertically aligned. Furthermore, it will be noted from FIG. 2, that the tip of the hookshaped protrusion 4, the elongate groove 5, and the locking bar 11 are all substantially vertically aligned with one another.

It will also be appreciated that in the embodiment described with reference to the various figures of the drawing, the removal of the locking bar 11 enables all of the auxiliary ballast weights 2 to be removed from the basic ballast weight 1. Furthermore, it will be noted that the locking bar 11 is freely retained in the arcuate channels 12 and 13 and thus can readily be inserted in or withdrawn from these channels.

If desired, the member 19 can be replaced by three auxiliary ballast weights 2. Alternatively, the basic ballast weight 1 can be used alone or with any number of auxiliary ballest weights 2. To insure that the ballast weights 2 rest firmly in the transverse groove 5, the facing sides 6 and 7 of the hook-shaped protrusions 4 and the transverse group 5 are of a wedge-shaped design. In the suspended position the ballast weights 2 rest with their vertical interfaces 8 against the front face of the support element 1. To secure the ballast weights 2, the locking bar 11 is used in the space formed by the semi-cylindrical recess 12 in the bottom face of the supporting element 1 and the semi-cylindrical recess 13 in the horizontally extending face 14 of the ballast weights 2. A boss may be added on the base of the U of the hitch member 19 which mates with the clevis in the basic ballast weight 1. A hole is provided in the boss which aligns axially with holes in the basic ballast weight 1 and in the top of the hitch member 19. The hitch pin is placed in the holes and secures the hitch member 19 to the basic weight 1.

The embodiments of the invention in which an exclusive property or priviledge is claimed are defined as follows:

1. A ballast weight assembly for mounting on the front end of a tractor, comprising:

a generally rectangular prismic-like base weight member connected across the front end of the tractor, the top side of the member having an elongate channel with at least one inclined wall extending upwardly toward the front side of the member and the inclined wall having at least one V-shaped notch also extending upwardly toward the front side of the member, the front side of the member having a centrally located cavity forming a clevis for a hitch, the top side further having a centrally located hole passing into the clevis, and the bottom side of the member having an elongate groove;

a generally rectangular prismic-like first weight mounted on the member, the first weight having a generally U-shaped opening at one side of the prism, one leg of the U having a notch with an inclined wall extending toward the opening of the U and forming a hook with a tip depending into the channel of the member, the inclined wall of the hook having an inverted V-shaped surface mating with the V-shaped notch in the channel, the base of the U abutting the front side of the member and the other leg of the U extending under the bottom side of the mbmer and having a transversely extending groove aligning vertically with the elongate groove in the bottom side of the member; and an elongate bar passing in the space between the grooves keying the mounted first weight to the base member.

2. A ballast weight assembly according to claim 1 wherein the tip of the hook in the channel is vertically aligned above the elongate bar.

3. A ballast weight assembly according to claim 1 wherein a cylindrical elongate bar is provided and the grooves in the member and first weight correspond to the curvature of the bar.

4. A ballast weight assembly according to claim 1 wherein the first weight is provided with a clevis on the side opposite the U-shaped opening, and the notched leg of the U is provided with an open hole axially aligning with the hole in the top side of the member; and further including a hitch pin passing through the holes hitching the first weight to the clevis of the member.

5. A ballast weight assembly according to claim 4 wherein the hitch pin is provided with a transverse hole which lies below the notched leg of the U; and further including a securing pin set in the transverse hole locking the hitch pin to the first weight.

6. A ballast weight assembly according to claim 1 wherein the inclined wall of the channel is provided with a plurality of side-by-side V-shaped notches extending the length of the channel, and including a plurality of auxiliary weights mounted side-by-side on both sides of the first weight, the auxiliary weights having hooks with inverted V-shaped surfaces nesting in the V-shaped notches in the inclined wall of the channel, and further having transversely extending grooves aligning vertically with the elongate groove in the bottom side of the member and the elongate bar passing in the space between the grooves keying all of the mounted weights to the base weight member.

7. A ballast weight assembly according to claim 6 wherein one end of the elongate bar is provided with an enlarged head portion, and notches are provided in the lateral side of the member and in the auxiliary weight adjacent the head portion countersinking the head portion, the opposite end of the bar having a transverse hole; and further including a securing pin set in the hole of the bar, and the opposite lateral side of the member and the opposite auxiliary weight adjacent the securing pin having notches countersinking the securing pin.

8. A ballast weight assembly according to claim 6, wherein the first weight is equal in width to three side-by-side auxiliary weights and is provided with a boss on the base of the U nesting in the clevis of the member, and the boss having an open hole axially aligning with the hole in the notched leg and the hole in the member, the hitch pin passing through all of the holes hitching the first weight to the clevis of the member.

9. A ballast weight assembly according to claim 8 wherein the hitch pin is provided with a transverse hole which lies in the space between the boss and the notched leg of the U; and further including a securing pin set in the transverse hole locking the hitch pin to the first weight.

10. A ballast weight assembly according to claim 8 wherein one end of the elongate bar is provided with an enlarged head portion, and notches are provided in the lateral side of the member and in the auxiliary weight adjacent the head portion countersinking the head portion, the opposite end of the bar having a transverse hole; and further including a securing pin set in the hole of the bar, and the opposite lateral side of the member and the opposite auxiliary weight adjacent the securing pin having notches countersinking the securing pin.

* * * * *